US011234223B2

(12) United States Patent
Wang et al.

(10) Patent No.: US 11,234,223 B2
(45) Date of Patent: Jan. 25, 2022

(54) TRANSMITTING UPLINK CONTROL INFORMATION

(71) Applicant: QUALCOMM Incorporated, San Diego, CA (US)

(72) Inventors: Renqiu Wang, San Diego, CA (US); Wanshi Chen, San Diego, CA (US); Peter Gaal, San Diego, CA (US); Wei Zeng, Saratoga, CA (US); Hao Xu, Beijing (CN); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/566,835

(22) Filed: Sep. 10, 2019

(65) Prior Publication Data

US 2020/0008191 A1 Jan. 2, 2020

Related U.S. Application Data

(63) Continuation of application No. 15/888,588, filed on Feb. 5, 2018, now Pat. No. 10,440,698.

(Continued)

(51) Int. Cl.
*H04W 72/04* (2009.01)
*H04L 5/00* (2006.01)

(52) U.S. Cl.
CPC ....... *H04W 72/0413* (2013.01); *H04L 5/0007* (2013.01); *H04L 5/0053* (2013.01);
(Continued)

(58) Field of Classification Search
USPC .......................................... 370/329
See application file for complete search history.

(56) References Cited

U.S. PATENT DOCUMENTS

| 9,578,632 B2 | 2/2017 | Chen et al. |
| 2009/0186613 A1* | 7/2009 | Ahn ........................ H04L 5/003 455/434 |

(Continued)

FOREIGN PATENT DOCUMENTS

| CN | 104272615 A | 1/2015 |
| EP | 2398181 A2 | 12/2011 |

(Continued)

OTHER PUBLICATIONS

CATT: "On waveform configuration for PUCCH", 3GPP Draft,3GPP TSG RAN WG1 AH_NR Meeting R1-1700200, 3rd Generation Partnership Project (3GPP), Mobile Competence Centre; 650, Route Des Lucioles; F-06921, Sophia-Antipolis Cedex; France, vol. RAN WG1, No. Spokane, USA; Jan. 16, 2017-Jan. 20, 2017, Jan. 16, 2017 (Jan. 16, 2017), 3 pages, XP051207740, Retrieved from the Internet: URL: http://www.3gpp.org/ftp/Meetings_3GPP_SYNC/RAN1/Docs/.

(Continued)

*Primary Examiner* — Jamaal Henson
(74) *Attorney, Agent, or Firm* — Procopio, Cory, Hargreaves & Savitch LLP

(57) ABSTRACT

In an aspect of the disclosure, a method, a computer-readable medium, and an apparatus are provided that may be configured to receive a downlink control message, to determine a beta offset value for transmitting UCI based at least in part on the downlink control message, and to transmit the UCI on an uplink shared channel interleaved with data based on the determined beta offset value. The apparatus may identify the beta offset from a set of values based on the downlink control message. An apparatus may identify resources allocated for PUSCH and may map UCI to the identified resources for PUSCH in a frequency interleaved manner over a bandwidth of the identified resources. The apparatus may map data to the identified resources in a (Continued)

time-first or frequency-first manner, and may transmit a signal comprising UCI and data on the identified resources of the PUSCH in accordance with the mapping.

34 Claims, 13 Drawing Sheets

Related U.S. Application Data

(60) Provisional application No. 62/455,541, filed on Feb. 6, 2017.

(52) U.S. Cl.
CPC .......... *H04L 5/0055* (2013.01); *H04L 5/0057* (2013.01); *H04L 5/0091* (2013.01); *H04W 72/042* (2013.01); *H04L 5/0044* (2013.01)

(56) References Cited

U.S. PATENT DOCUMENTS

| | | | |
|---|---|---|---|
| 2010/0195624 A1* | 8/2010 | Zhang | H04B 7/0413 370/335 |
| 2010/0254335 A1 | 10/2010 | Koo et al. | |
| 2011/0243066 A1* | 10/2011 | Nayeb Nazar | H04L 1/1671 370/328 |
| 2011/0310855 A1* | 12/2011 | Yin | H04L 1/0067 370/336 |
| 2011/0310986 A1 | 12/2011 | Heo et al. | |
| 2013/0114756 A1 | 5/2013 | Jia et al. | |
| 2014/0226540 A1 | 8/2014 | Park et al. | |
| 2014/0286255 A1* | 9/2014 | Nam | H04L 27/2613 370/329 |
| 2015/0208391 A1 | 7/2015 | Park | |
| 2017/0251463 A1 | 8/2017 | Kwak et al. | |
| 2017/0359114 A1 | 12/2017 | Akkarakaran et al. | |
| 2018/0110041 A1* | 4/2018 | Bendlin | H04W 72/044 |
| 2018/0227908 A1 | 8/2018 | Wang et al. | |
| 2020/0068556 A1* | 2/2020 | Tiirola | H04L 5/0053 |
| 2020/0077386 A1* | 3/2020 | Papasakellariou | H04L 5/0053 |

FOREIGN PATENT DOCUMENTS

| | | |
|---|---|---|
| WO | 2015148001 A1 | 10/2015 |
| WO | 2016182394 A1 | 11/2016 |
| WO | 2017019132 A1 | 2/2017 |

OTHER PUBLICATIONS

Nokia., et al., "UCI Multiplexing in the Presence of UL Data", 3GPP Draft, 3GPP TSG RAN WG1 #NR, R1-1701016_UCI with UL Data_Final, 3rd Generation Partnership Project (3GPP), Mobile Competence Centre, 650, Route Des Lucioles, F-06921 Sophia-Antipolis Cedex, France, vol. RAN WG1, No. Spokane, WA, USA, Jan. 16, 2017-Jan. 20, 2017, Jan. 16, 2017 (Jan. 16, 2017), XP051208531, 3 Pages, Retrieved from the Internet: URL: http://www.3gpp.org/ftp/Meetings_3GPP_Sync/RAN1/Docs/, [retrieved on Jan. 16, 2017].
"3rd Generation Partnership Project; Technical Specification Group Network; Evolved Universal Terrestrial Radio Access (E-UTRA); Physical procedures (Release 8)", 3GPP Standard; Technical Specification, 3GPP TS 36.213, 3rd Generation Project (3GPP), Mobile Competence 650, Route Des Lucioles; F-06921, Sophia-Antipolis Cedex; France, vol. RAN WG1, No. V8.8.0, Sep. 19, 2009 (Sep. 19, 2009), pp. 1-77, XP051296169, [retrieved on Sep. 19, 2009].
"3rd Generation Partnership Project; Technical Specification Group Radio Access Network; Evolved Universal Terrestrial Radio Access (E-UTRA); Multiplexing and channel coding (Release 8)", 3GPP Standard; Technical Specification; 3GPP TS 36.212, 3rd Generation Partnership Project (3GPP), Mobile Competence Centre; 650, Route Des Lucioles; F-06921 Sophia-Antipolis Cedex; France, vol. RAN WG1, No. V8.8.0, Dec. 9, 2009 (Dec. 9, 2009), pp. 1-60, XP051296226, [retrieved on Dec. 9, 2009].
"3rd Generation Partnership Project; Technical Specification Group Radio Access Network; Evolved Universal Terrestrial Radio Access (E-UTRA); Physical Channels and Modulation (Release 8)", 3GPP Standard; 3GPP TS 36.211, 3rd Generation Partnership Project (3GPP), Mobile Competence Centre ; 650, Route Des Lucioles ; F-06921 Sophia-Antipolis Cedex; France, No. V8.8.0, Sep. 1, 2009 (Sep. 1, 2009), pp. 1-83, XP050377540.
International Search Report and Written Opinion—PCT/US2018/017135—ISA/EPO—dated Aug. 10, 2018.
Partial International Search Report—PCT/US2018/017135—ISA/EPO—dated May 16, 2018.
Samsung: "UCI and Data Multiplexing", 3GPP Draft; R1-1700953 UCI and Data Multiplexing-Samsung, 3rd Generation Partnership Project (3GPP), Mobile Competence Centre; 650, Route Des Lucioles; F-06921 Sophia-Antipolos Cedex; France, vol. RAN WG1, No. Spokane, USA; Jan. 16, 2017-Jan. 20, 2017, Jan. 16, 2017 (Jan. 16, 2017), pp. 1-5, XP051208469, Retrieved from the Internet: URL: http://www.3gpp.org/ftp/Meetings_3GPP_SYNC/RAN1/Docs/ [retrieved on Jan. 16, 2017].
Samsung: "On UCI Multiplexing in PUSCH", 3GPP Draft; R1-1700948, UCI on PUSCH, 3rd Generation Partnership Project (3GPP), Mobile Competence Centre; 650, Route Des Lucioles; F-06921 Sophia-Antipolis Cedex; France, vol. RAN WG1, No. Spokane, USA; Jan. 16, 2017-Jan. 20, 2017, Jan. 16, 2017 (Jan. 16, 2017), XP051208464, Retrieved from the Internet: URL: http://www.3gpp.org/ftp/Meetings_3GPP_SYNC/RAN1/Docs/ [retrieved on Jan. 16, 2017].
"3rd Generation Partnership Project; Technical Specification Group Radio Access Network; Evolved Universal Terrestrial Radio Access (E-UTRA); Multiplexing and Channel Coding (Release 14)", 3GPP TS 36.212 V14.1.1, Jan. 2017, pp. 1-149.
Taiwan Search Report—TW107104106—TIPO—dated May 7, 2021.
Qualcomm Incorporated: "UCI and Data Multiplexing", 3GPP TSG-RAN WG1 #88-bis, R1-1705614, Apr. 3-7, 2017, Spokane, US, pp. 1-4, URL: https://www.3gpp.org/ftp/tsg_ran/WG1_RL1/TSGR1_88b/Docs/R1-1705614.zip, Mar. 25, 2017.

* cited by examiner

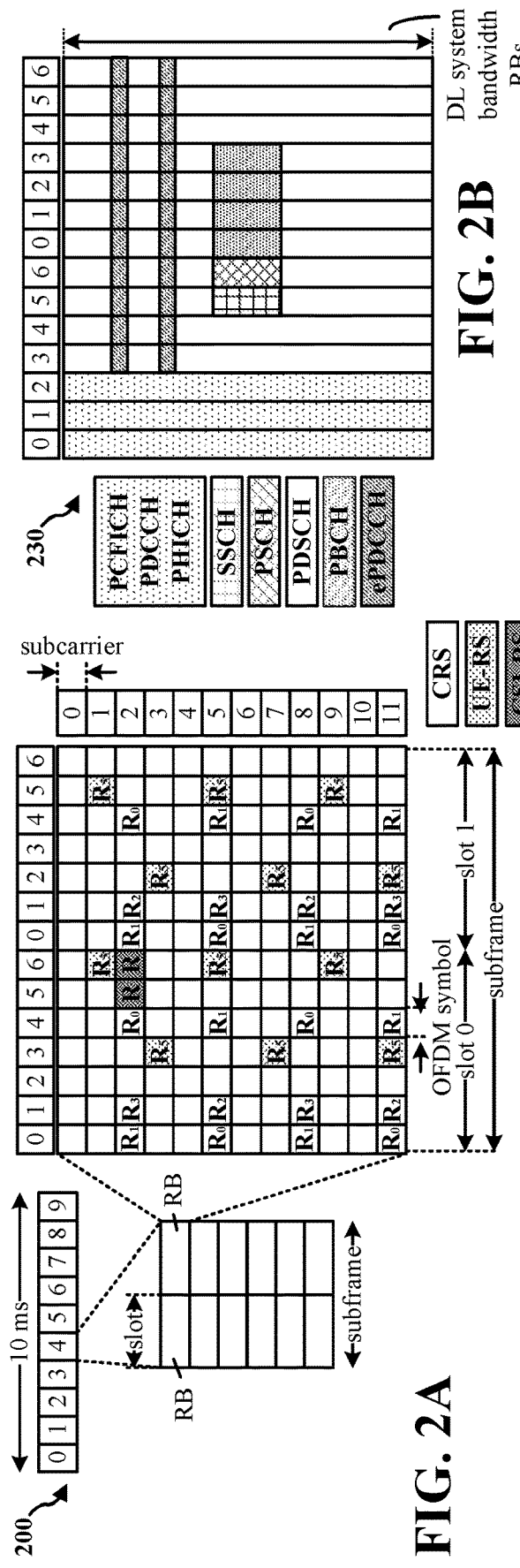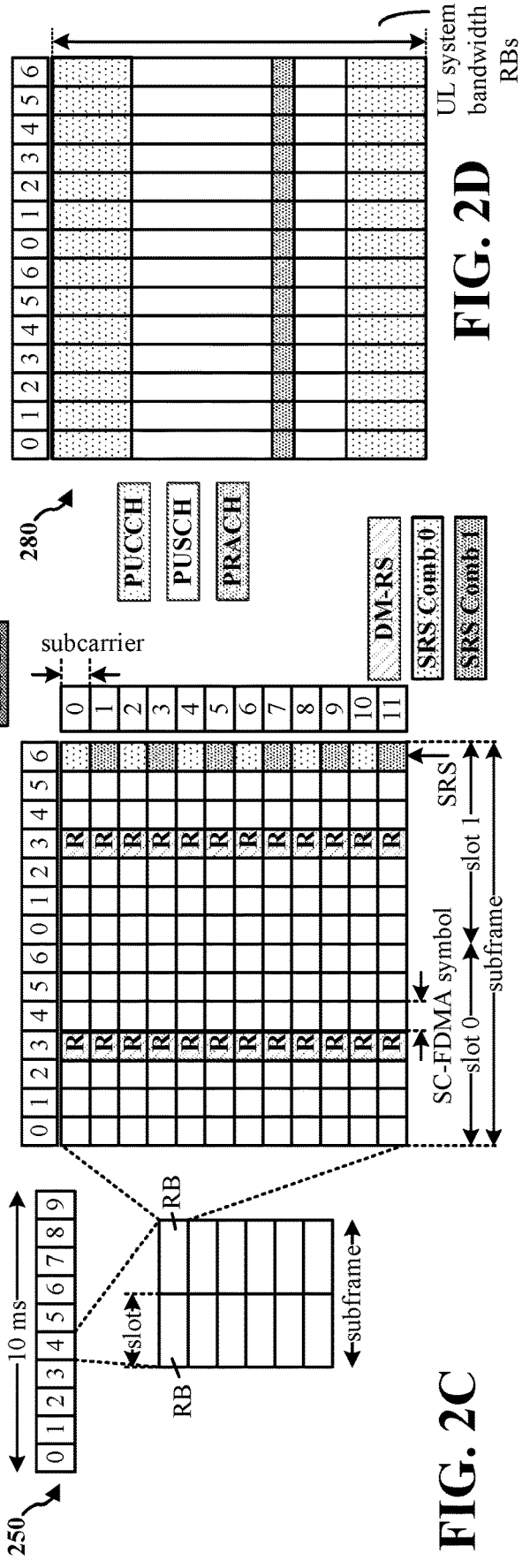

TRANSMITTING UPLINK CONTROL INFORMATION

CROSS-REFERENCE TO RELATED APPLICATION

This application is a Continuation of U.S. patent application Ser. No. 15/888,588, entitled "Transmitting Uplink Control Information" and filed on Feb. 5, 2018, which claims the benefit of U.S. Provisional Application Ser. No. 62/455,541, entitled "Transmitting Uplink Control Information" and filed on Feb. 6, 2017, which are expressly incorporated by reference herein in their entirety.

BACKGROUND

Field

The present disclosure relates generally to communication systems, and more particularly, to transmitting uplink control information on a physical uplink shared channel.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A semi-static beta offset for uplink control information (UCI) (e.g., any combination of ACK/NACK, channel quality information (CQI), or Rank Indicator (RI)) may lead to waste of resources, e.g., when a beta-offset value is too conservative in order to meet performance requirement. At times, the beta-offset may lead to insufficient resources for UCI and may not meet performance requirements.

The present application provides a solution to the problem of wasted resources and insufficient UCI resources through a base station dynamically configuring a beta-offset for UCI. For example, the base station may indicate a set of beta values to the UE, e.g., Radio Resource Control (RRC) configuration. Then, the base station may indicate at least one beta value from the set of beta values, e.g., in Downlink Control Information (DCI). Different beta offset values may be configured for different types of UCI. UCI may be frequency interleaved with data in allocated physical uplink shared channel (PUSCH) resources.

In an aspect of the disclosure, a method, a computer-readable medium, and an apparatus are provided for wireless communication at a user equipment (UE). The apparatus maybe configured to receive a downlink control message and to determine a beta offset value from a plurality of beta offset values for transmitting uplink control information based at least in part on the downlink control message. The apparatus may be configured to transmit the UCI on an uplink shared channel interleaved, e.g., in a frequency domain, with data based on the determined beta offset value.

In an aspect of the disclosure, a method, a computer-readable medium, and an apparatus are provided for wireless communication at a UE. The apparatus maybe configured to identify resources for transmission of a signal on a PUSCH. The apparatus may map UCI to the identified resources of the signal on the PUSCH in a frequency-interleaved manner over a bandwidth of the identified resources. The apparatus may map data to the PUSCH over the bandwidth of the identified resources in a time-first or frequency-first manner. Then, the apparatus may transmit the signal on the identified resources of the PUSCH in accordance with the mapping. The apparatus may further determine a beta offset value for the UCI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
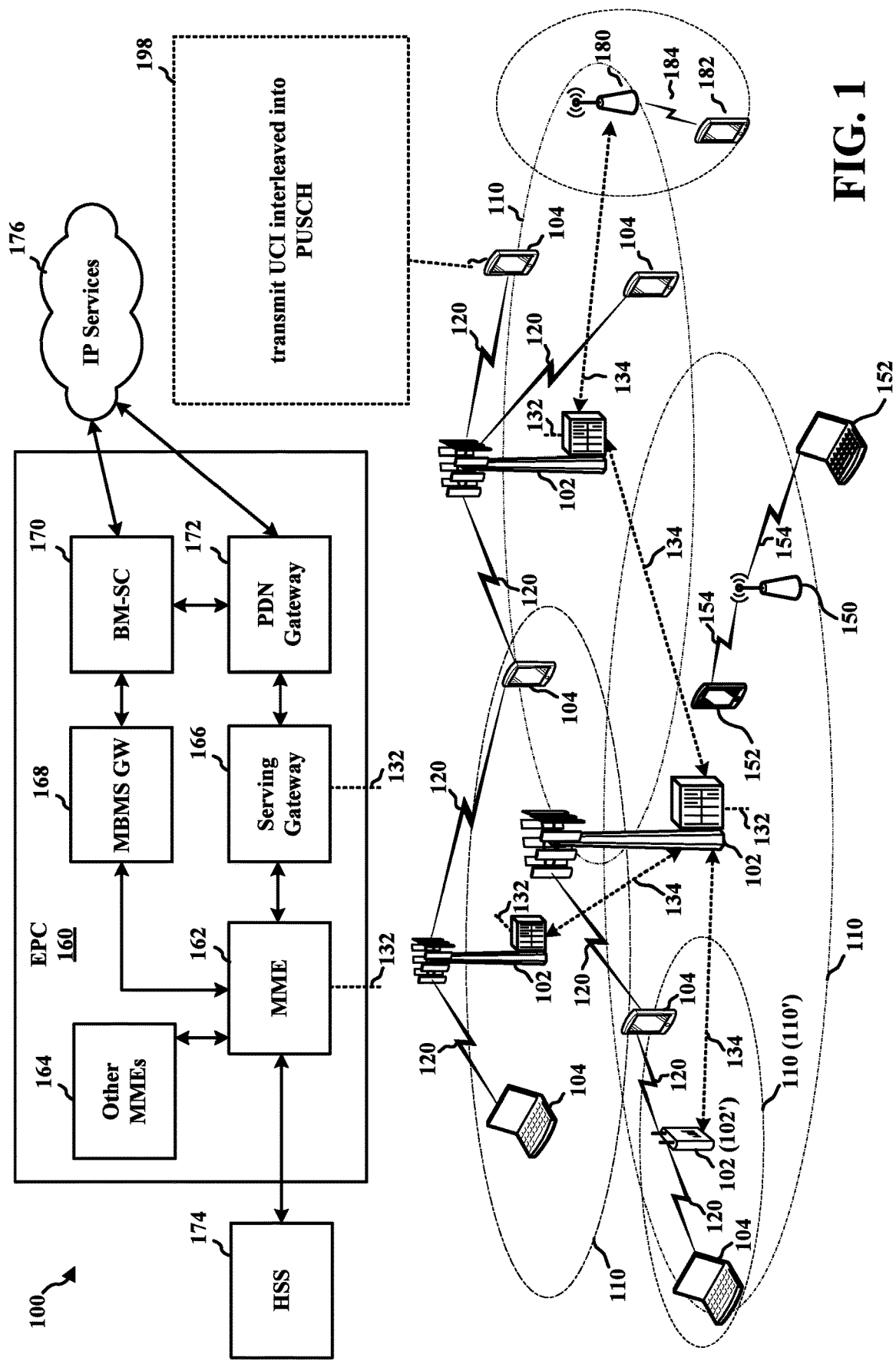
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 182 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit uplink control information interleaved into a physical uplink shared channel (198).

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, orthogonal frequency division multiplex (OFDM) symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
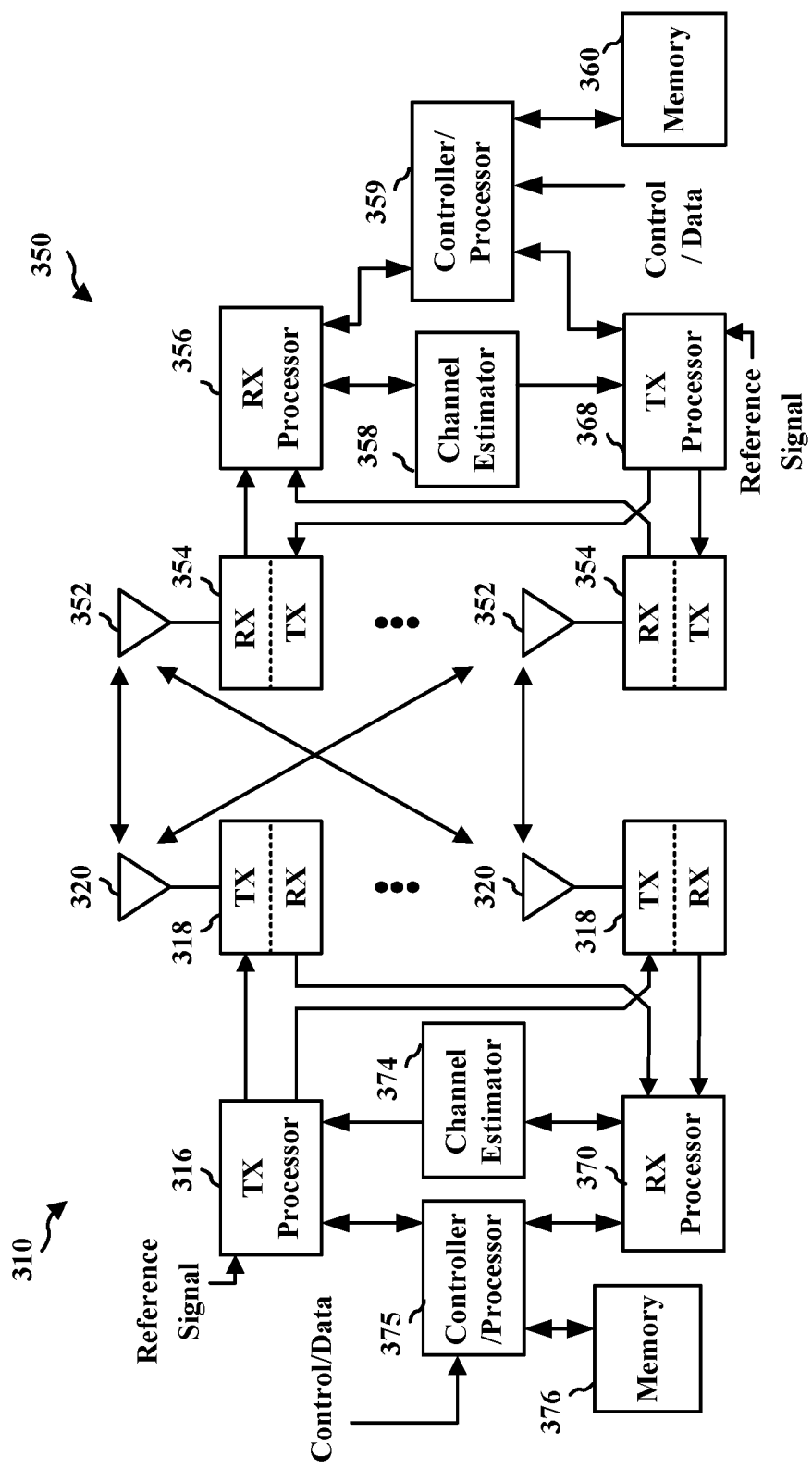
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes an RRC layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
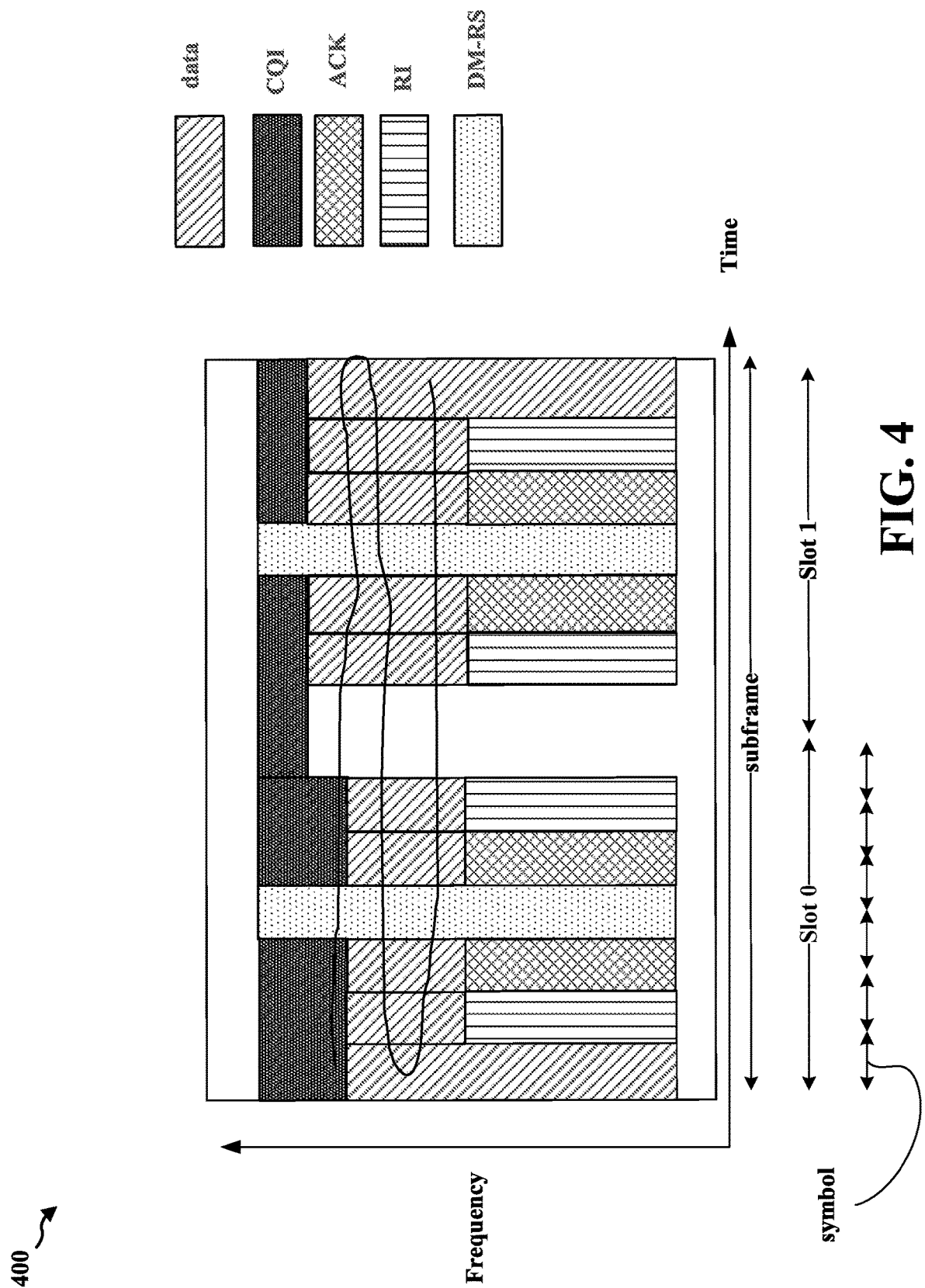
FIG. 4 is a diagram of a resource mapping for PUSCH in which UCI (e.g., CQI, ACK, RI, and DM-RS) is transmitted on the PUSCH.

Although UCI may be transmitted on the PUCCH, UCI may also be transmitted on the PUSCH. FIG. 4 is a diagram 400 of a resource mapping for PUSCH resources in which UCI (e.g., CQI, ACK, RI, and DM-RS) is transmitted on the PUSCH allocated resources. As shown in FIG. 4, a subframe may include two slots (e.g., slot 0 and slot 1). Each slot may have resource mappings or allocations for transmitting data, CQI, ACK/NACK, RI, and DM-RS. The DM-RS may be transmitted within a symbol. Each slot may have a symbol allocated for transmitting DM-RS. FIG. 4 illustrates DM-RS transmitted across the bandwidth of the PUSCH allocated resources in the middle of the slot. Next to each DM-RS symbol may be a symbol for transmitting ACK/NACK and RI. The symbols for transmitting RI may be adjacent to the symbols for transmitting ACK/NACK. In an aspect, the symbols for transmitting RI and ACK/NACK may be closer to the DM-RS symbol to enable more reliable decoding of RI and ACK/NACK. The ACK/NACK may puncture the PUSCH, and the RI. The PUSCH may be rate matched around the RI. The CQI may be first time mapped for transmission and subsequently frequency mapped with PUSCH data (different from control information) rate matched round that mapped UCI.

In an aspect, a Discrete Fourier Transform (DFT) may be applied to each symbol after resource mapping to maintain a SC-FDM waveform. In another aspect, a beta offset may be used to control the number of resources allocated for UCI transmission. The beta offset may be semi-statically configured. However, semi-static beta offset configurations may lead to wasted or insufficient resources for UCI. Thus, as presented herein, the beta offset may be dynamically configured by the base station. In an aspect, the beta offset may be different depending on the UCI type. In another aspect, each UCI type may be associated with a single beta offset value that is semi-statically configured.

The resource mapping design in FIG. 4, however is less flexible and may not be optimal for different waveforms and communication technologies. For example, because the DM-RS follows certain portions of CQI, data, ACK/NACK, and RI, a device that receives earlier portions of CQI, data, ACK/NACK, and RI may not decode the information until after the device receives the DM-RS and performs channel estimation.

Figure 5:
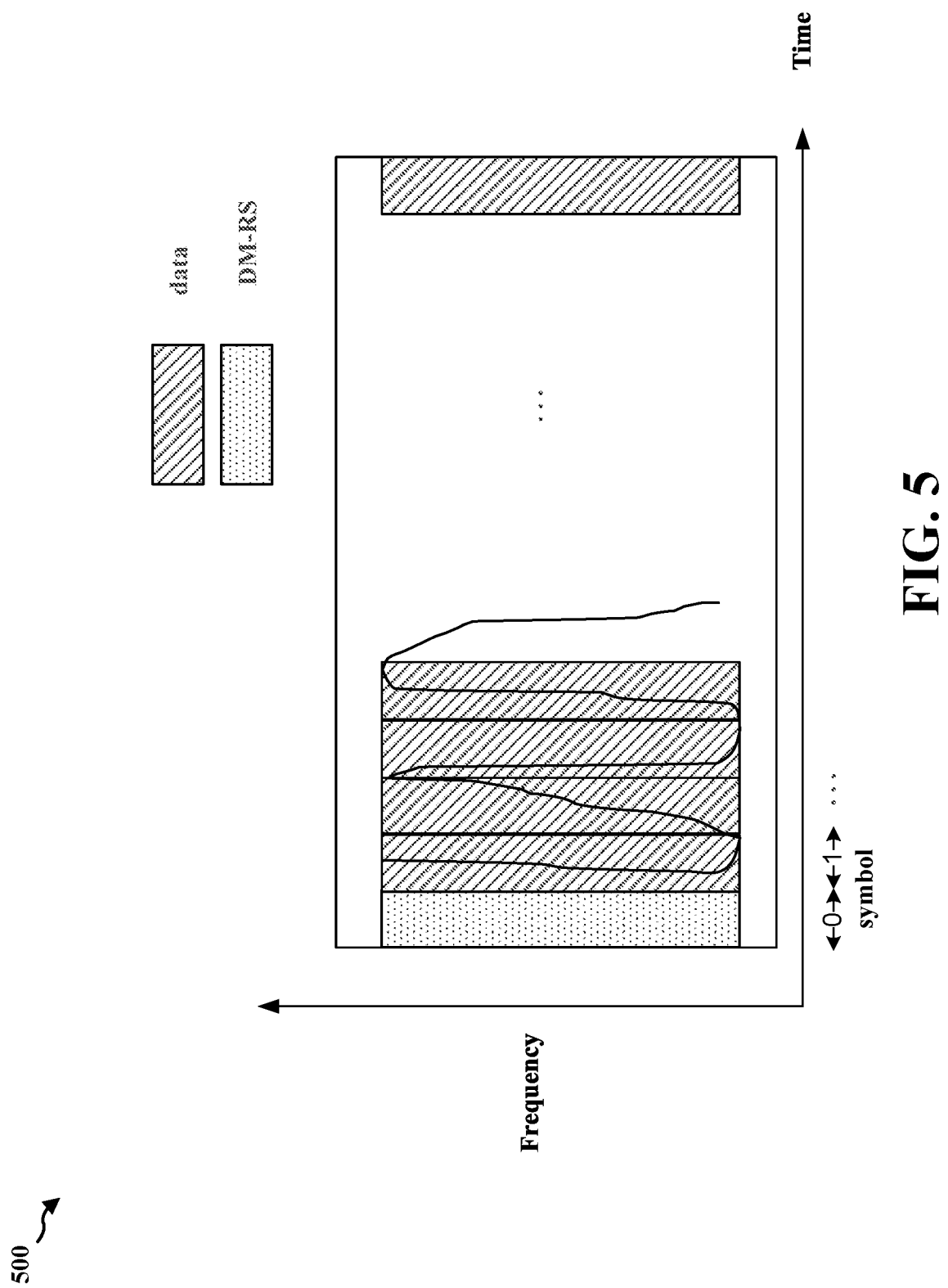
FIG. 5 is a diagram illustrating a resource mapping of a PUSCH in UL long duration with no UCI.

FIG. 5 is a diagram 500 illustrating a resource mapping of a PUSCH in UL long duration with no UCI. The resource mapping may be for 5G/NR communication. The PUSCH may be transmitted using either a single carrier or OFDM waveform. Unlike in FIG. 4, the symbol for transmitting the DM-RS may be front loaded. For example, the symbol for transmitting the DM-RS may be the first symbol of a slot or an RB. Referring to FIG. 5, the first symbol may be used to transmit DM-RS, and subsequent symbols, may be used to transmit data. In an aspect, the PUSCH may be mapped in a frequency first fashion.

A single front loaded DM-RS symbol may be ideal for UEs exhibiting low mobility (e.g., the UE does not change positions and/or does not change positions frequently). In another aspect, if the UE is moving at high speeds, then additional DM-RS symbols may be added to the PUSCH resource mapping.

By utilizing a front loaded DM-RS symbol, a base station receiving the transmission on the PUSCH may perform channel estimation based on the DM-RS and immediately start decoding the subsequent data (or code blocks) following the DM-RS symbol. For example, the base station could determine whether an ACK/NACK was received from a UE quicker (in a shorter timeline). This information reduces overall turnaround time and may allow the base station to dynamically adjust subsequent resource grants for data transmission.

Because the PUSCH may have different waveforms, it may be beneficial to have a common design for both waveforms to reduce complexity. A target design of resource mapping of UCI on the PUSCH may strive for maximum commonality for both DFT-spread-OFDM (single carrier like waveform) and cyclic prefix (CP)-OFDM (OFDM waveform). Thus, the UCI mapping principles may be in common for PUSCH having a DFT-s-OFDM waveform and PUSCH having a CP-OFDM waveform. Further, the resource mapping may exploit both time and frequency domain diversity for UCI.

Figure 6:
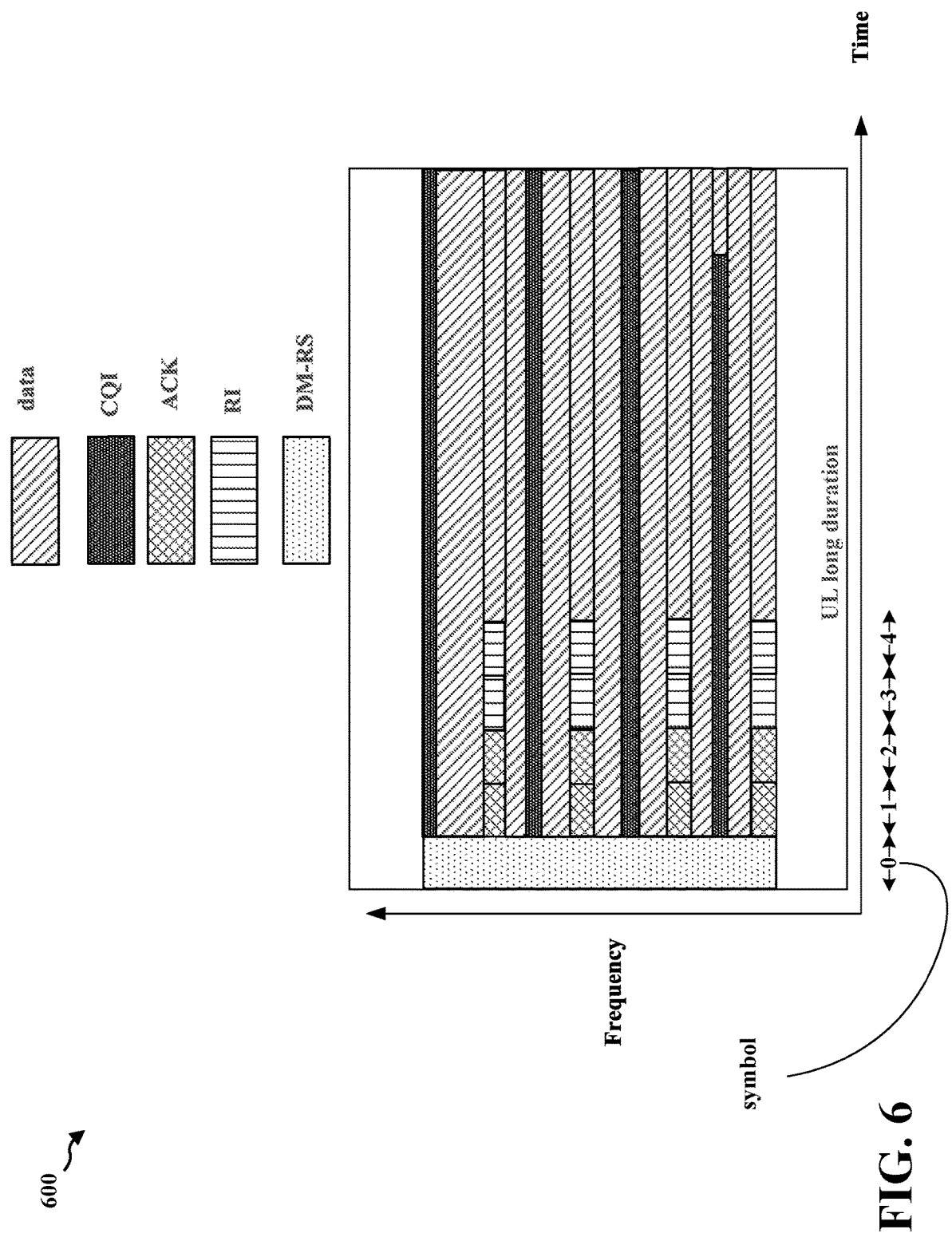
FIG. 6 is an example diagram of resource mapping for PUSCH in which UCI is transmitted on the PUSCH.
Figure 7B:
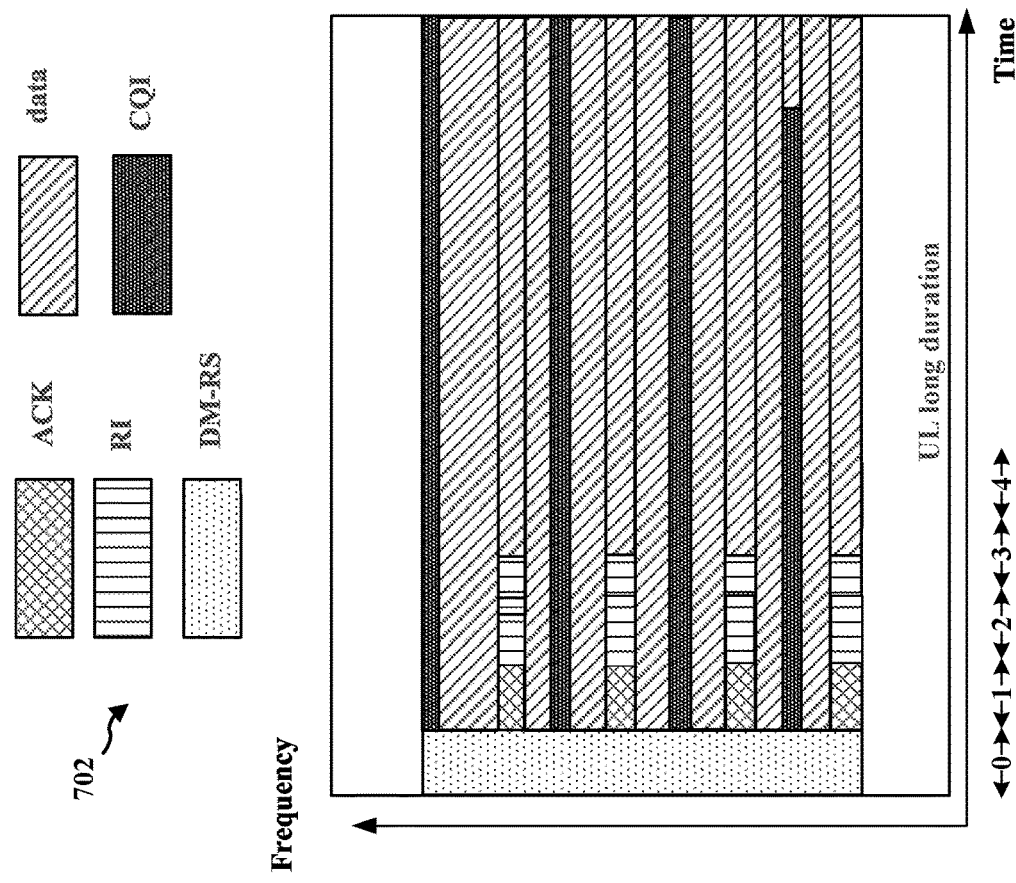
FIGS. 7A and 7B are example diagrams of resource mapping for PUSCH in which UCI is transmitted on the PUSCH.
Figure 7A:
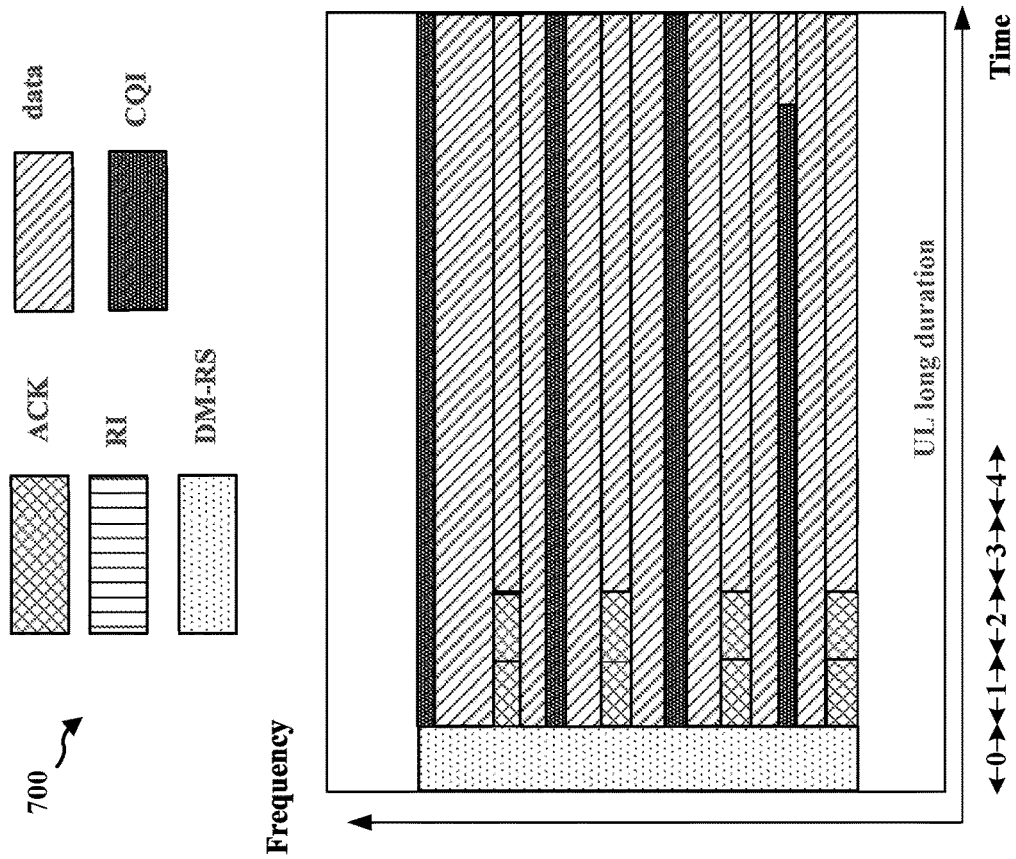
Figure 8:
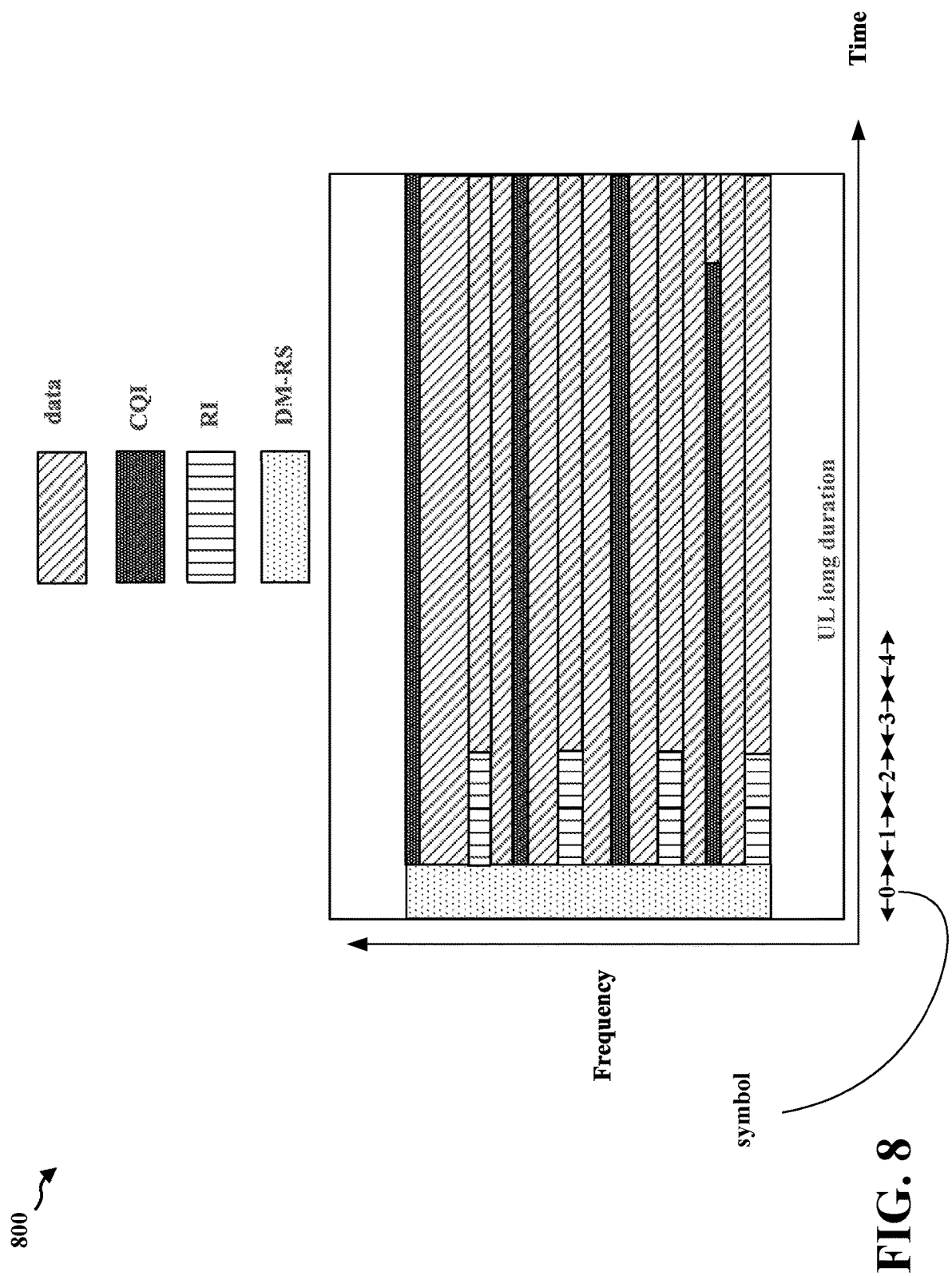
FIG. 8 is an example diagram of resource mapping for PUSCH in which UCI is transmitted on the PUSCH.

FIG. 6 is an example diagram 600 of resource mapping for PUSCH resources, e.g., PUSCH RBs, in which UCI is transmitted on the PUSCH. Referring to FIG. 6, a DM-RS symbol is front loaded in a first symbol of a slot/subframe as illustrated in the blue region. UCI tones are interleaved in frequency diversity and/or time diversity. FIGS. 6 and 7 illustrate UCI comprising ACK/NACK, CQI, and RI. FIG. 8 illustrates an example in which the UCI comprises CQI and RI. The UCI may comprise any combination of UCI, e.g., including any combination of CSI, ACK/NACK, RI, etc. In an aspect, different UCI types may have different mappings in the time domain. Referring to FIG. 6, the ACK/NACK symbols may be mapped adjacently to the DM-RS symbol to provide the best channel estimation protection. Thus, the ACK/NACK UCI may be piggybacked on PUSCH. As illustrated in FIG. 6, the ACK/NACK may be distributed in REs across the allocated PUSCH RBs. The RI symbols may be adjacent to the ACK/NACK symbols. CQI may be interleaved in different OFDM symbols. Data is also transmitted in the PUSCH resources along with the UCI. ACK tones may puncture data tones. CQI and RI may be rate matched around. Unlike in FIG. 4, in which the UCI (e.g., the ACK/NACK and RI) is interleaved only in the time domain, in FIG. 6, the UCI is also interleaved in the frequency domain. Thus, the CQI UCI (e.g., CSI) may be piggybacked on PUSCH. As illustrated in FIG. 6, the CQI may be distributed in REs across the allocated PUSCH RBs. That is, multiple sets of tones in the frequency domain may be used to transmit CQI, ACK/NACK, and/or RI, which increases frequency diversity. In FIG. 6, CQI, ACK/NACK and/or RI are also interleaved in the frequency and/or time domain. That is, multiple symbols may be used to transmit CQI, multiple symbols may be used to transmit ACK/NACK, and multiple symbols may be used to transmit RI. In some examples, the CQI may use all OFDM symbols. In another aspect, data may be transmitted on the PUSCH with either a frequency-first or time-first mapping.

In some instances, because the ACK/NACK and RI may be transmitted in the first few symbols (e.g., DM-RS is transmitted on symbol index 0, ACK/NACK may be transmitted on symbol indices 1, 2, and RI may be transmitted on symbol indices 3, 4), the code words or code blocks transmitted in the data region of symbol indices 1, 2, 3, 4 may be adversely impacted if mapped in a frequency first fashion. In one option, a time first mapping may be utilized, which may impact the time line of the resource mapping. In another option, the payload size corresponding to the first few code blocks may be reduced (e.g., from 1000 bits to 500 bits per code word) such that a single code word fits within the data tones in symbols 1, 2, 3, 4 that are not mapped for UCI. The changed payload size may either be explicitly signaled in PDCCH or may be implicitly calculated based on the resources assigned to UCI.

FIG. 6 illustrates an example in which the ACK/NACK UCI is mapped to symbol 1 and symbol 2, following the DM-RS in symbol 0. FIG. 7A illustrates example resource mapping 700 for PUSCH in which the ACK/NACK and CQI UCI are mapped to the PUSCH. FIG. 7B illustrates example resource mapping 702 for PUSCH in which the ACK/NACK UCI is mapped to only symbol 1 following the DM-RS in symbol 0. In this example, RI may be mapped to symbol 2 and symbol 3. FIG. 7 illustrates example resource mapping 800 for PUSCH in which the RI is mapped to the symbol adjacent to the DM-RS, e.g., in symbol 1 and symbol 2, following the DM-RS in symbol 0.

As discussed supra, the UCI mapping principles may be in common for PUSCH having a DFT-s-OFDM waveform and PUSCH having a CP-OFDM waveform.

As previously discussed, a beta offset may be utilized to determine the resources mapped or allocated for transmitting UCI on the PUSCH. A single semi-static beta offset value per UCI type, however, may not be optimal. On the one hand, if the beta offset value is too conservative (e.g., too many resources are allocated for UCI), then resources may be wasted and, while UCI performance requirements may be met, performance requirements for data transmission in the PUSCH may be adversely affected. On the other hand, if an insufficient number of resources is allocated for UCI, then performance requirements for UCI may not be met because UCI was not provided in a timely fashion.

Dynamically configurable beta offsets may be beneficial. In an aspect, a base station may dynamically signal beta offset values via the PDCCH grant (e.g., via the DCI). In this aspect, the exact or actual beta offset value may be provided in the PDCCH. A separate beta offset value may be signaled for each type of UCI. For example, a first beta offset applicable to ACK/NACK, a second beta offset applicable to RI, and a third beta offset applicable to CQI may be signaled separately to the UE. A separate set of offsets may be signaled by the base station and utilized by the UE depending upon whether the uplink transmission uses an SC-FDM waveform or an OFDM waveform.

In another aspect, beta offset values may be signaled for each UCI type via RRC configuration, and the base station may utilize one or more bits in the PDCCH to indicate a selection of the particular beta offset value for the particular UCI type in a current transmission. Thus, the base station may configure multiple sets of beta offset values in the RRC signaling. Then, the base station may indicate a particular set of beta offset values within the previously signaled sets in PDCCH, e.g., via DCI. By using a dynamically configurable beta offset value, different waveforms may be associated with different beta offset values, and each beta offset value associated with the particular UCI type may be used to determine a number of tones allocated for transmitting UCI associated with the particular UCI type. For example, the beta offset value for ACK/NACK may indicate that 24 tones are allocated for transmitting ACK/NACK UCI.

In an aspect, the resource mapping structure illustrated in FIG. 6 may be applicable to both single carrier and OFDM waveforms. For single carrier waveforms, the waveform may be subjected to DFT.

In another aspect, the beta offset values per UCI type for different waveforms may be different. For example, a single carrier waveform may use one set of beta offset values for ACK. An OFDM waveform may use a different set of beat offset values for ACK. The beta offset value adopted for the current transmission may depend on information provided in the DCI bits as well as the waveform selected.

In another aspect, the beta offset values for one UCI type may also be dependent on UCI payload size. For example, a large ACK payload size may be assigned with a beta offset value selected for large resources while a small ACK payload size may be assigned with a beta offset value selected for small resources.

Figure 9:
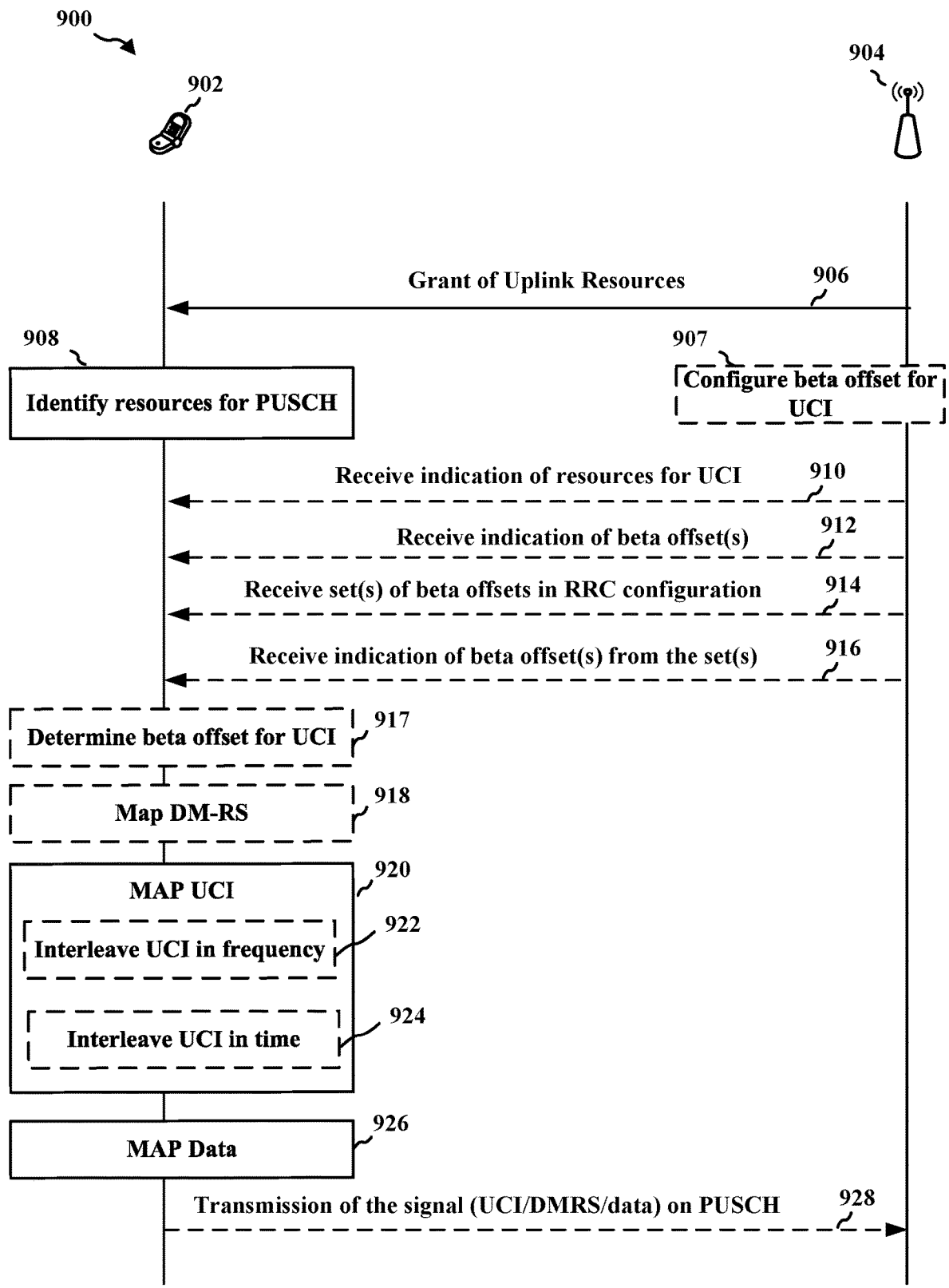
FIG. 9 is an example communication flow between a UE and base station.

FIG. 9 illustrates an example communication flow 900 between a UE 902 (e.g., UE 104, 350, the apparatus 1202, 1202') and a base station 904 (e.g., base station 102, 180, 310, 1250). Optional aspects are illustrated with a dashed line. The wireless communication may comprise 5G/NR wireless communication. The base station 904 may indicate resources available to the UE for uplink communication, e.g., the base station may transmit at 906 a grant of PUSCH resources. The UE may identify resources for PUSCH at 908, e.g., based on the information received from the base station. As illustrated at 907, the base station may dynamically configure a beta offset for UCI. Different types of UCI may have different beta offset values. The base station may indicate the beta offset for the UCI to the UE in any of a number of ways. The base station may directly indicate a beta offset value for the UCI at 912, e.g., via DCI. The base station may indicate a set of beta values to the UE, e.g., in RRC configuration, at 914. The base station may then dynamically indicate a beta offset value at 916 from among the previously indicated set(s), e.g., in DCI in PDCCH. The UE may use the information received from the base station to determine the beta offset for the UCI, e.g., to determine a dynamically configured beta offset for the UCI. Thus, at 917, the UE may determine a beta offset value, from among a plurality of beta offset values, for transmitting UCI based on a downlink control message.

The UE may then map the UCI to the identified PUSCH resources at 920. The mapping may include frequency interleaving the UCI at 922 and/or time interleaving the UCI at 924. The mapping may be based on the beta offset determined at 917. the UCI mapping principles may be in common for PUSCH having a DFT-s-OFDM waveform and PUSCH having a CP-OFDM waveform. Thus, UCI, including ACK/NACK, CSI, etc., may be piggybacked on the allocated PUSCH resources. As illustrated in FIGS. 6, 7A, 7B, and 8, the ACK/NACK information, the CSI, and/or the RI may be mapped to distributed REs across the PUSCH allocated RBs.

The UE may map DM-RS at 918 to the first symbol of the subframe/slot. ACK/NACK UCI information may then be mapped to symbols adjacent to the DM-RS, e.g. in a frequency interleaved manner. After mapping the UCI to the PUSCH resources, the UE may map data to the identified PUSCH resources at 926. At 928, the UE may transmit a PUSCH signal, e.g., comprising DM-RS in a first symbol, comprising UCI interleaved in a frequency domain and/or in a time domain, and data.

Figure 10:
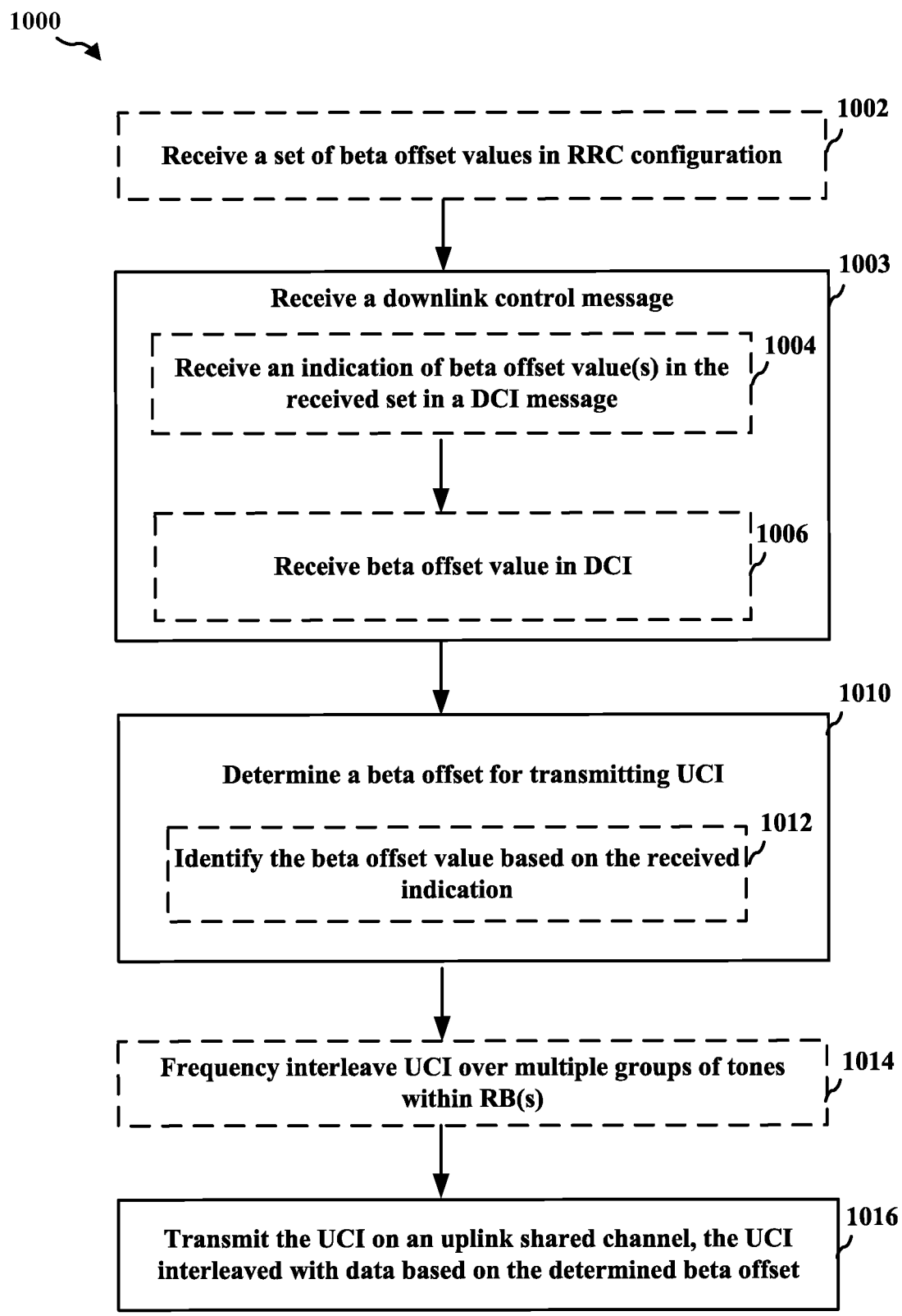
FIG. 10 is a flowchart of a method of wireless communication.

FIG. 10 is a flowchart 1000 of a method of wireless communication. The method may be performed by a UE (e.g., UE 104, 350, 902, the apparatus 1202, 1202') communication wirelessly with a base station (e.g., base station 102, 180, 310, 904, 1250). The wireless communication may comprise 5G/NR wireless communication.

At 1003, the UE receives a downlink control message, e.g., DCI. At 1010, the UE determines a beta offset value for transmitting UCI based at least in part on the downlink control message. The beta offset value may be dynamically configurable by the base station.

As illustrated at 1006, the UE may receive an indication of the beta offset value in a DCI message. Thus, the beta offset value may be determined from among a plurality of beta offset values at 1010 based on the indication of the beta offset value received in the DCI message at 1006.

In another example, the UE may receive a set of beta offset values in an RRC configuration at 1002. At 1004, the UE may receive an indication of at least one beta offset value from the set of beta offset values at 1004. The indication at 1004 may be received in a DCI message from the base station. Then, the UE may identify, at 1012, the beta offset value from the set of beta offset values received at 1004 based on the indication received at 1006.

The UCI may comprise any combination of ACK/NACK information, RI information, and/or CQI. FIGS. 6 and 7B illustrate examples with ACK/NACK, RI, and CQI. FIG. 7A illustrates an example with CQI and ACK/NACK. FIG. 8 illustrates an example with RI and CQI. CQI may be frequency interleaved on different groups of tones than the ACK/NACK information and/or the RI information. The ACK/NACK information and the RI information may be frequency interleaved on the same group of tones and may be located on different symbols of that same group of tones. For example, FIG. 6 illustrates ACK/NACK and RI transmitted on the same tones, where ACK/NACK is transmitted in symbol 1 and symbol 2 and RI is transmitted in symbol 3 and symbol 4. In the example in FIG. 7, ACK/NACK is transmitted in symbol 1 and RI is transmitted in symbol 2 and symbol 3. The ACK may be transmitted on a first set of symbols adjacent to a DM-RS symbol, and the RI may be transmitted on a second set of symbols adjacent to the first set of symbols. FIGS. 6 and 7 illustrate DM-RS transmitted in symbol 0, with ACK/NACK and RI following in adjacent symbols 1, 2, 3, and 4. The DM-RS may be front loaded, e.g., transmitted in a first symbol. FIGS. 5-8 illustrate the DM-RS transmitted in symbol 0 of a subframe/slot.

Then, at 1016, the UE transmits the UCI on an uplink shared channel (e.g., PUSCH) interleaved based on the determined beta offset value. For example, the UCI may be interleaved with the data in at least a frequency domain, e.g., such as illustrated in the examples of FIGS. 6, 7A, 7B, and 8. Therefore, the UE may further interleave the UCI with the data at 1014. The UCI may be further interleaved in a time domain based on the beta offset value determined at 1010, e.g., such as illustrated in the examples of FIGS. 6, 7A, 7B, and 8.

The UCI may be transmitted with UCI subcarriers. The UCI subcarriers may be comprised in the uplink data channel resources. The data channel, e.g., PUSCH, may be provided in a single carrier waveform or an OFDM waveform.

In one example, the UE may further frequency interleave the UCI over a multiple groups of tones or REs within at least one RB, at 1014, as illustrated in FIGS. 6, 7A, 7B, and 8.

The beta offset value may be based on a type of waveform used by the UE for transmitting the UCI, e.g., an SC-FDM waveform or OFDM waveform. The beta offset may be based on a UCI type and/or a UCI payload size. Thus, the UE may determine different beta offsets for different types of UCI.

Figure 11:
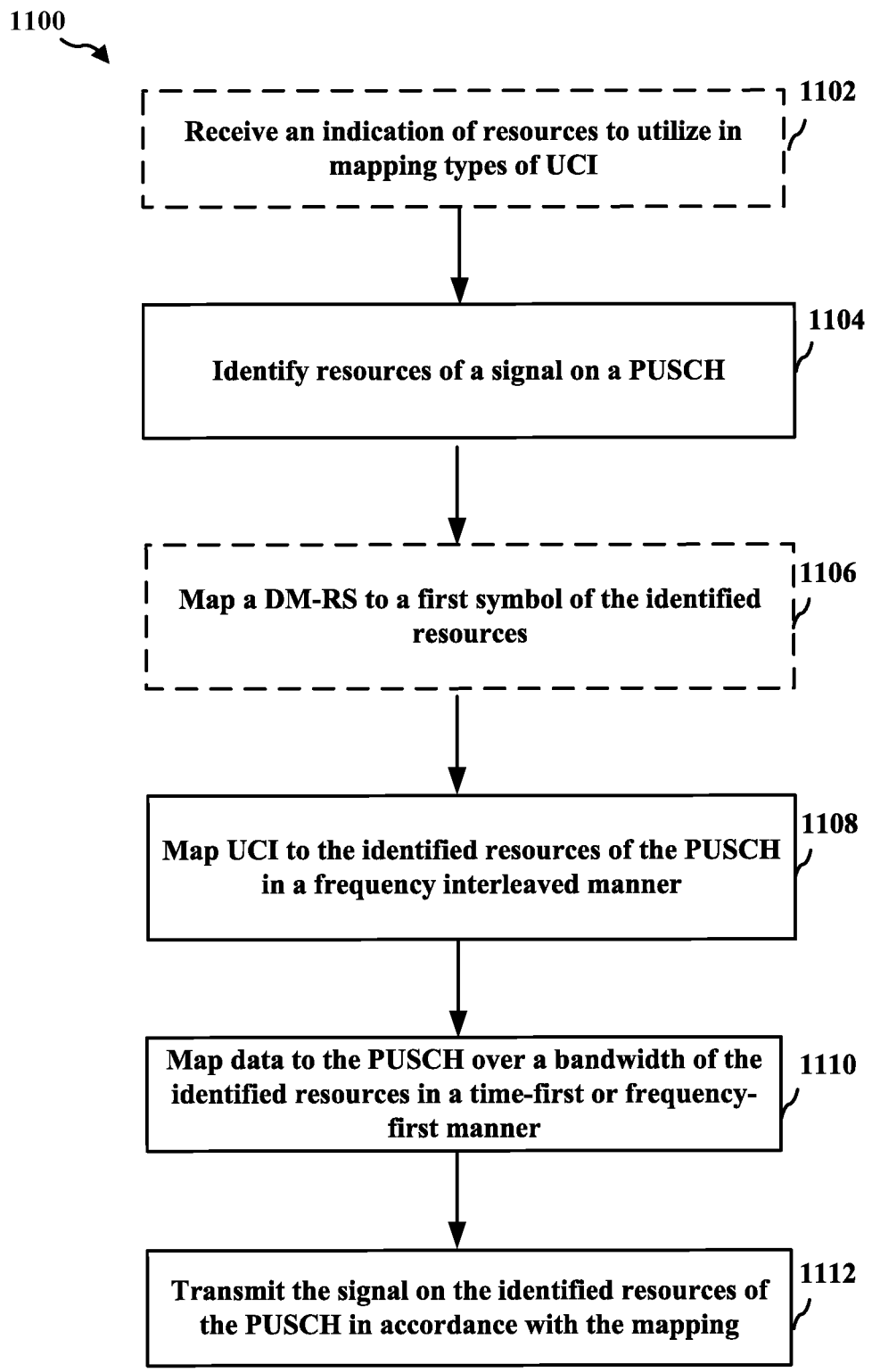
FIG. 11 is a flowchart of a method of wireless communication.

FIG. 11 is a flowchart 1100 of a method of wireless communication. The method may be performed by a UE (e.g., UE 104, 350, 902, the apparatus 1202, 1202') communication wirelessly with a base station (e.g., base station 102, 180, 310, 904, 1250). The wireless communication may comprise 5G/NR wireless communication. Aspects of the methods of FIG. 10 and FIG. 11 may be performed by the same UE.

At 1104, the UE identifies resources for transmission of a signal on a PUSCH. For example, the resources may comprise resources allocated to the UE by the base station for uplink transmissions, e.g., for PUSCH.

At 1108, the UE maps UCI to the identified resources of the signal on the PUSCH in a frequency interleaved manner over a bandwidth of the identifies resources. The UCI may comprise any combination of ACK/NACK information, CQI, and RI. For example, FIGS. 6, 7A, 7B, and 8 illustrate examples of various combinations of CQI, ACK/NACK, and/or RI mapped in a frequency interleaved manner. In addition to frequency interleaving, the UCI may be mapped in a time-interleaved manner. The mapping of the UCI to the identified resources of the PUSCH at 1108 may comprise a common resource mapping for a CP-OFDM waveform and a DFT-spread-OFDM waveform. In one example, the UCI may comprise both ACK/NACK information and CQI. At least a part of the CQI may be separately encoded from the ACK/NACK information. In another example the UCI may include CQI, and the CQI may be time interleaved in addition to being frequency interleaved. Thus, the ACK/NACK and/or CQI UCI may be piggybacked on PUSCH. As illustrated in FIGS. 6, 7A, 7B, and 8, the ACK/NACK and/or CQI may be distributed in REs across the allocated PUSCH RBs.

At 1110, the UE maps data to the PUSCH over the bandwidth of the identified resources in a time-first or a frequency-first manner. FIGS. 6, 7A, 7B, and 8 illustrate the data mapped around the PUSCH resources for the UCI.

As illustrated at 1106, the UE may map a DM-RS to a first symbol of the identified resources. In one example, the UCI may comprise ACK/NACK information that is mapped to one or more symbols adjacent to the DM-RS according to the frequency interleaving, e.g., in the frequency interleaved manner. FIG. 6 illustrates an example in which the ACK/NACK information is mapped to two symbols adjacent to the DM-RS, and FIG. 7B illustrates an example in which the ACK/NACK information is mapped to one symbol adjacent to the DM-RS. FIG. 7A illustrates an example in which the UCI information comprise CQI and ACK/NACK but not RI. Thus, the ACK/NACK information may be transmitted on a first set of symbols adjacent to a DM-RS symbols, and a portion of Channel State Information (CSI) may be transmitted on a second set of symbols after the first set of symbols. For example, the portion of CSI may comprise RI.

The UE may receive an indication of a number of resources to utilize in mapping the UCI, as illustrated at 1102. Although illustrated prior to identifying the resources, this indication at 1102 may also be received after the resources of the signal on the PUSCH are identified at 1104. The indication may indicate a different number of resources to be used for different types of UCI, e.g., a first type of UCI and a second type of UCI.

The indication received at 1102 may comprise information regarding at least one beta offset value in a plurality of beta offset values indicative of the number of resources to utilize in mapping the UCI. Multiple beta offset values may be indicative, e.g., for different types of UCI. Thus, the indication may comprise different beta offset values corresponding to different types of UCI. For example, beta offset values may be received indicating the number of resources for each of ACK/NACK information, CQI, and/or RI. Thus, different beta offset values may correspond to different types of UCI. The beta offset value(s) may be signaled to the UE from the base station 1250 in a downlink control message, e.g., in DCI providing a grant of uplink resources. The beta offset values may be signaled in relation to values established by an RRC configuration of the UE, e.g., as described in connection with 1002 and 1004 of FIG. 10. The beta offset value(s) may correspond to one of an OFDM or an SC-FDM transmission of the signal.

Finally, at 1112, the UE transmits the signal on the identified resources of the PUSCH in accordance with the mapping.

Figure 12:
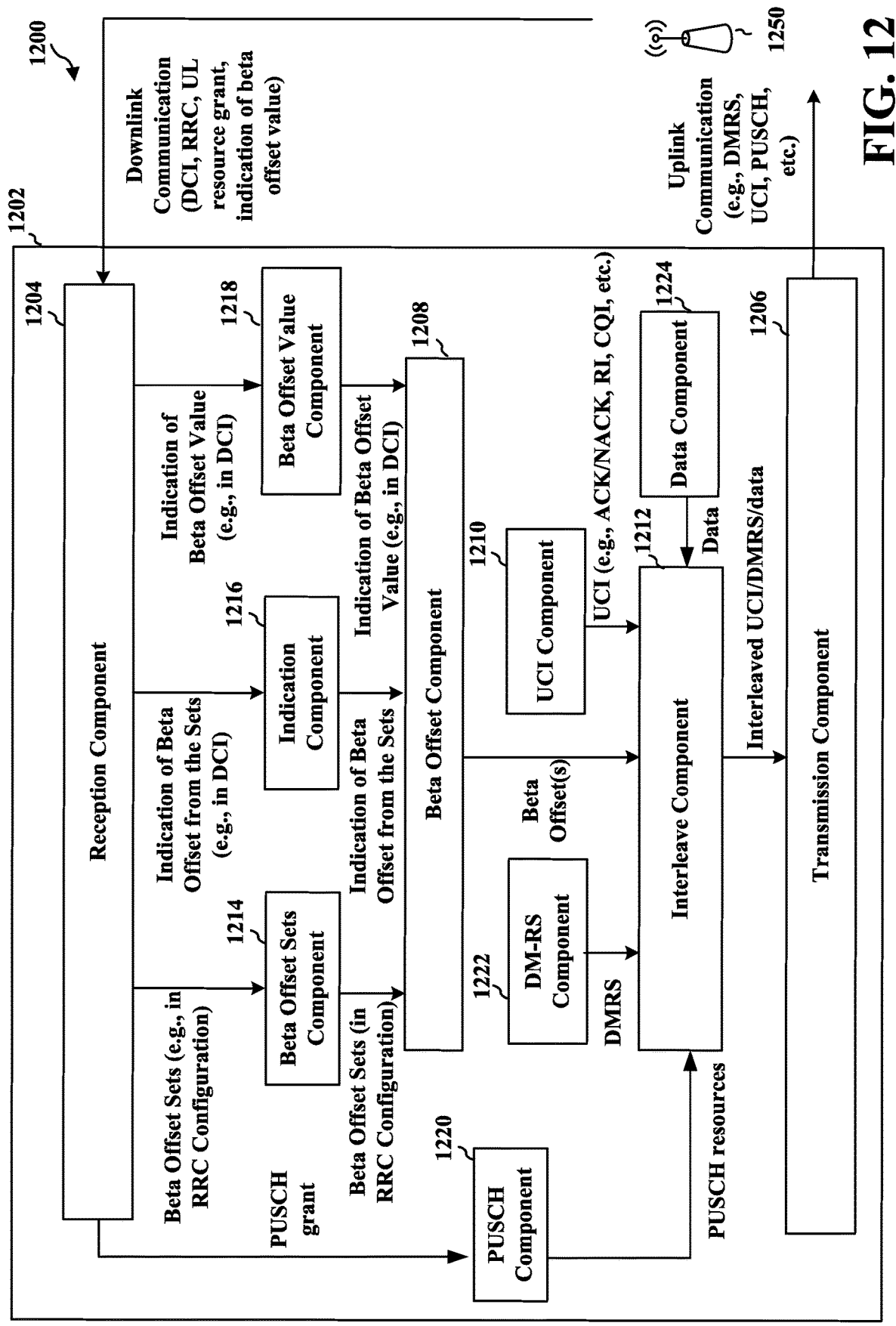
FIG. 12 is a conceptual data flow diagram illustrating the data flow between different means/components in an example apparatus.

FIG. 12 is a conceptual data flow diagram 1200 illustrating the data flow between different means/components in an example apparatus 1202. The apparatus may be a UE (e.g., UE 104, 350, 902) communicating wirelessly with base station 1250 (e.g., base station 102, 180, 310, 904) The apparatus includes a reception component 1204 that receives downlink communication from base station 1250, and a transmission component 1206 that transmits uplink communication to the base station 1250. The downlink communication may include, among others, downlink control messages, RRC configuration, DCI, a grant of uplink resources (e.g., PUSCH resources), indications of beta offset values, etc., as described in connection with FIGS. 9-11. Uplink communication may include, among others, DM-RS, UCI, PUSCH, as described in connection with FIGS. 4-11.

The apparatus may include a beta offset value component 1218 configured to receive an indication of a beta offset value, e.g., in DCI from the base station 1250. The apparatus may include a beta offset sets component 1214 configured to receive a set of beta offset values from the base station 1250, e.g., in RRC configuration. The apparatus may include an indication component 1216 configured to receive an indication of the beta offset value in a downlink message.

The apparatus may further include a beta offset value component 1208 configured to determine a beta offset value for transmitting UCI. The beta offset value component may determine the beta offset at least in part on an indication in the downlink control message received by indication component 1216.

The indication may indicate the beta offset value from the set of beta offset values received at component 1214. The received information from any of components 1214, 1216, 1218 may be provided to the beta offset component 1208 for use in determining the beta offset value for the UCI. Thus, the beta offset component may identify the beta offset value(s) for the UCI from among the received beta offset value sets based on the received indication.

Transmission component 1206 may be configured to transmit the UCI on an uplink data channel interleaved, e.g., in the frequency domain, based on the determined beta offset value.

Thus, the apparatus may comprise an interleave component 1212 that is configured to frequency and/or time interleave the UCI with data and/or DM-RS on PUSCH.

The apparatus may include a PUSCH component 1220 configured to determine resources for transmission of a signal on an uplink shared channel, e.g., PUSCH, e.g., from a grant of uplink resources from the base station. The apparatus may include a UCI component 1210 configured to map the UCI to the identified PUSCH resources in a frequency interleaved manner, e.g., in connection with the interleave component 1212. The apparatus may include a data component 1224 configured to map data to the PUSCH resources in a time-first or frequency-first manner. The apparatus may include a DM-RS component 1222 configured to map a DM-RS to a first symbol of the identified resources. The transmission component 1206 may be configured to transmit the signal on the identified resources of the PUSCH in accordance with the mapping. The apparatus may receive an indication of a number of resources to utilize in mapping the UCI, e.g., via any of components 1208, 1212, 1216, 1218.

The apparatus may include additional components that perform each of the blocks of the algorithm in the aforementioned flowcharts of FIGS. 9, 10, and 11. As such, each block in the aforementioned flowcharts of FIGS. 9, 10, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
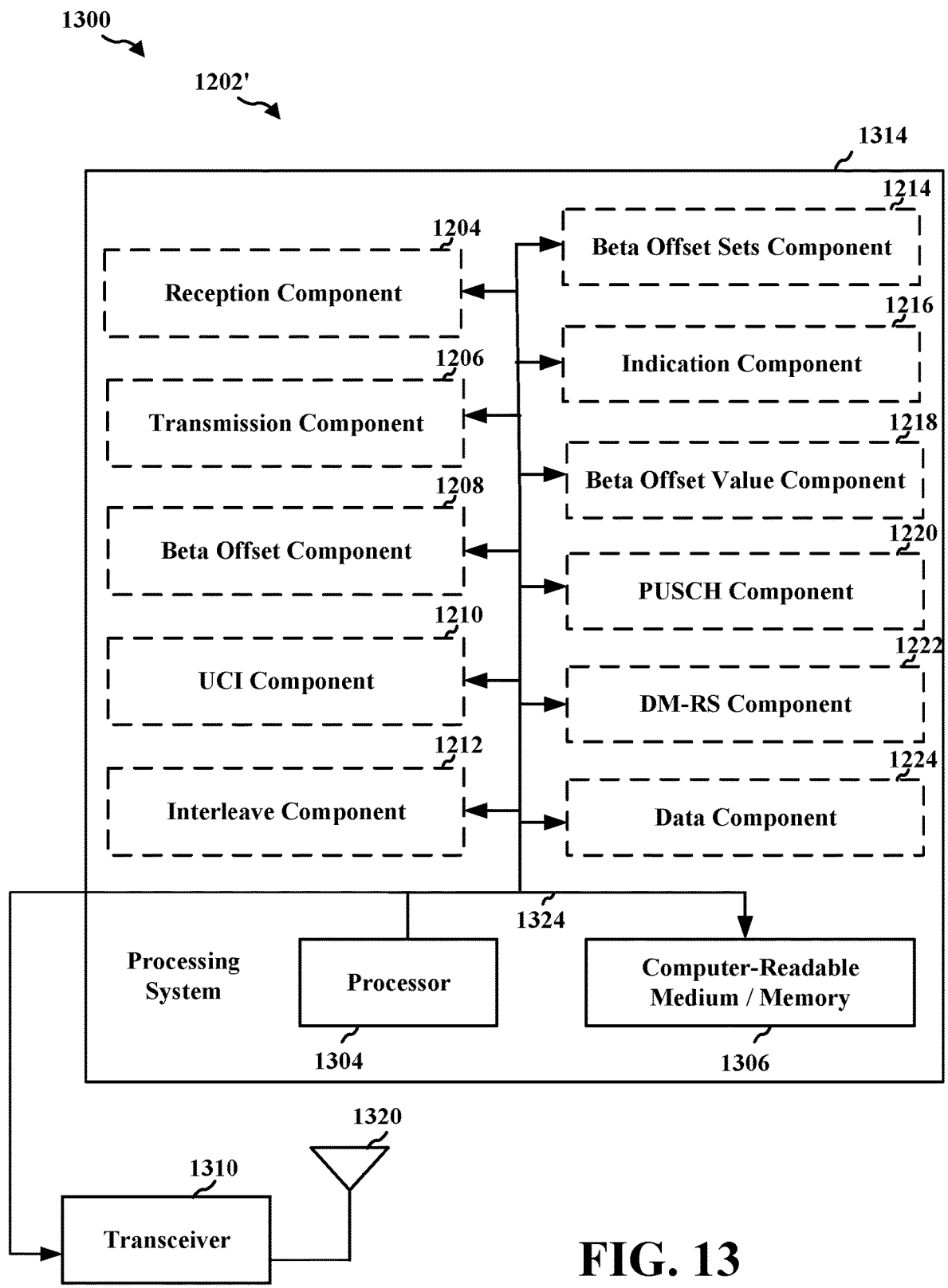
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, 1218, 1220, 1222, 1224, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1206, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216, 1218, 1220, 1222, 1224. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication includes means for receiving a downlink control message (e.g., 1204, 1216, 1218) means for determining a beta offset value for transmitting UCI (e.g., 1208) based at least in part on the downlink control message, means for transmitting the UCI on an uplink shared channel interleaved, e.g., in a frequency domain, with data based on the beta offset value (e.g., 1212, 1206), means for receiving the beta offset value (e.g., 1218), means for receiving a set of beta offset values (e.g., 1214), means for receiving an indication of the beta offset value in the set of beta offset values (e.g., 1216), means for identifying the beta offset value based on the received indication (e.g., 1208), means for frequency interleaving the UCI (e.g., 1212), means for time interleaving the UCI (e.g., 1212), means for identifying resources for a signal on a PUSCH (e.g., 1220), means for mapping UCI to the identified resources (e.g., 1210, 1212), means for mapping data to the PUSCH (e.g., 1224, 1212), means for transmitting the signal (e.g., 1206), means for mapping a DM-RS (e.g., 1222, 1212), and means for receiving an indication of a number of resources to utilize in mapping the UCI (e.g., 1214, 1216, 1218). The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment, comprising:
   identifying resources for an uplink transmission on a physical uplink shared channel (PUSCH);
   mapping a first type of uplink control information (UCI) to the identified resources in a frequency-interleaved manner over a bandwidth of the identified resources;
   mapping a second type of UCI to the identified resources in the frequency-interleaved manner over the bandwidth of the identified resources, at least one of the first type of UCI or the second type of UCI being mapped to resources that overlap in time and are distributed over a plurality of non-adjacent sets of tones in frequency based on a dynamically configurable parameter;
   mapping data to the PUSCH over the bandwidth of the identified resources in a time-first or a frequency-first manner; and
   transmitting the uplink transmission on the identified resources of the PUSCH in accordance with the mapping, the uplink transmission comprising the first type of UCI and the second type of UCI frequency-interleaved with the data.

2. The method of claim 1, wherein the first type of UCI comprises ACK/NACK information and the second type of UCI comprises channel state information (CSI).

3. The method of claim 1, wherein the dynamically configurable parameter comprises a beta offset, the method further comprising:
   receiving an indication of a first beta offset value indicative of a first amount of resources to utilize in mapping the first type of UCI and an indication of a second beta offset value indicative of a second amount of resources to utilize in mapping the second type of UCI.

4. The method of claim 3, wherein the first type of UCI is mapped to the identified resources in the frequency-interleaved manner over the bandwidth of the identified resources based on the first beta offset value and the second type of UCI is mapped to the identified resources in the frequency-interleaved manner over the bandwidth of the identified resources based on the second beta offset value.

5. The method of claim 4, wherein the first beta offset value and the second beta offset value are different, and the first type of UCI and the second type of UCI are associated with different mappings based on the first beta offset value and the second beta offset value.

6. The method of claim 3, wherein the indication of the first beta offset value and the indication of the second beta offset value are signaled in a downlink control message.

7. The method of claim 3, wherein the indication of the first beta offset value and the indication of the second beta offset value are signaled in relation to values established by a radio resource control (RRC) configuration of the user equipment.

8. The method of claim 3, wherein the first beta offset value and the second beta offset value correspond to one of a single carrier frequency division multiplex (SC-FDM) or an orthogonal frequency division multiplex (OFDM) transmission of the uplink transmission.

9. The method of claim 3, wherein the first beta offset value and the second beta offset value are different.

10. The method of claim 1, wherein the first type of UCI or the second type of UCI comprises ACK/NACK information, the method further comprising:
   mapping a demodulation reference signal (DM-RS) to a first symbol of the identified resources, wherein the ACK/NACK information is mapped to one or more symbols adjacent to the DM-RS in the frequency-interleaved manner.

11. The method of claim 1, wherein the first type of UCI comprises ACK/NACK information and the second type of UCI comprises channel quality information (CQI), wherein at least a part of the CQI comprised in the second type of UCI is separately encoded from the ACK/NACK information.

12. The method of claim 1, wherein the first type of UCI or the second type of UCI comprises channel quality information (CQI), and wherein the CQI is time interleaved with the data in addition to being frequency interleaved.

13. The method of claim 1, wherein a common resource mapping for a Cyclic Prefix (CP)-Orthogonal Frequency Division Multiplexed (OFDM) waveform and a Discrete Fourier Transform (DFT)-spread-OFDM waveform is used to map the first type of UCI and the second type of UCI to the PUSCH.

14. The method of claim 1, wherein the first type of UCI and the second type of UCI are mapped to resources in different sets of tones.

15. The method of claim 1, wherein at least some resources to which the first type of UCI is mapped and at least some resources to which the second type of UCI is mapped overlap in time and are in different tones.

16. An apparatus for wireless communication at a user equipment, comprising:
   a memory; and
   at least one processor coupled to the memory and configured to:
      identify resources for an uplink transmission on a physical uplink shared channel (PUSCH);
      map a first type of uplink control information (UCI) to the identified resources in a frequency-interleaved manner over a bandwidth of the identified resources;
      map a second type of UCI to the identified resources in the frequency-interleaved manner over the bandwidth of the identified resources, at least one of the first type of UCI or the second type of UCI being mapped to resources that overlap in time and are distributed over a plurality of non-adjacent sets of tones in frequency based on a dynamically configurable parameter;
      map data to the PUSCH over the bandwidth of the identified resources in a time-first or a frequency-first manner; and
      transmit the uplink transmission on the identified resources of the PUSCH in accordance with the mapping, the uplink transmission comprising the first type of UCI and the second type of UCI frequency-interleaved with the data.

17. The apparatus of claim 16, wherein the first type of UCI comprises ACK/NACK information and the second type of UCI comprises channel state information (CSI).

18. The apparatus of claim 16, wherein the dynamically configurable parameter comprises a beta offset, and the at least one processor is further configured to:
   receive an indication of a first beta offset value indicative of a first amount of resources to utilize in mapping the first type of UCI and an indication of a second beta offset value indicative of a second amount of resources to utilize in mapping the second type of UCI.

19. The apparatus of claim 18, wherein the first type of UCI is mapped to the identified resources in the frequency-interleaved manner over the bandwidth of the identified resources based on the first beta offset value and the second type of UCI is mapped to the identified resources in the frequency-interleaved manner over the bandwidth of the identified resources based on the second beta offset value.

20. The apparatus of claim 18, wherein the indication of the first beta offset value and the indication of the second beta offset value are signaled in a downlink control message.

21. The apparatus of claim 18, wherein the indication of the first beta offset value and the indication of the second beta offset value are signaled in relation to values established by a radio resource control (RRC) configuration of the user equipment.

22. The apparatus of claim 18, wherein the first beta offset value and the second beta offset value correspond to one of a single carrier frequency division multiplex (SC-FDM) or an orthogonal frequency division multiplex (OFDM) transmission of the uplink transmission.

23. The apparatus of claim 16, wherein the first type of UCI or the second type of UCI comprises ACK/NACK information, wherein the at least one processor is further configured to:
   map a demodulation reference signal (DM-RS) to a first symbol of the identified resources, wherein the ACK/NACK information is mapped to one or more symbols adjacent to the DM-RS in the frequency-interleaved manner.

24. The apparatus of claim 16, wherein the first type of UCI comprises ACK/NACK information and the second type of UCI comprises channel quality information (CQI), wherein at least a part of the CQI comprised in the second type of UCI is separately encoded from the ACK/NACK information.

25. The apparatus of claim 16, wherein the first type of UCI or the second type of UCI comprises channel quality information (CQI), and wherein the CQI is time interleaved with the data in addition to being frequency interleaved.

26. The apparatus of claim 16, wherein a common resource mapping for a Cyclic Prefix (CP)-Orthogonal Frequency Division Multiplexed (OFDM) waveform and a Discrete Fourier Transform (DFT)-spread-OFDM waveform is used to map the first type of UCI and the second type of UCI to the PUSCH.

27. An apparatus for wireless communication by a user equipment, comprising:
   means for identifying resources for an uplink transmission on a physical uplink shared channel (PUSCH);
   means for mapping a first type of uplink control information (UCI) to the identified resources in a frequency-interleaved manner over a bandwidth of the identified resources;
   means for mapping a second type of UCI to the identified resources in the frequency-interleaved manner over the bandwidth of the identified resources, at least one of the first type of UCI or the second type of UCI being mapped to resources that overlap in time and are distributed over a plurality of non-adjacent sets of tones in frequency based on a dynamically configurable parameter;
   means for mapping data to the PUSCH over the bandwidth of the identified resources in a time-first or a frequency-first manner; and
   means for transmitting the uplink transmission on the identified resources of the PUSCH in accordance with the mapping, the uplink transmission comprising the first type of UCI and the second type of UCI frequency-interleaved with the data.

28. The apparatus of claim 27, wherein the first type of UCI comprises ACK/NACK information and the second type of UCI comprises channel state information (CSI).

29. The apparatus of claim 27, wherein the dynamically configurable parameter comprises a beta offset, the apparatus further comprising:
   means for receiving an indication of a first beta offset value indicative of a first amount of resources to utilize in mapping the first type of UCI and an indication of a second beta offset value indicative of a second amount of resources to utilize in mapping the second type of UCI.

30. The apparatus of claim 29, wherein the first type of UCI is mapped to the identified resources in the frequency-interleaved manner over the bandwidth of the identified resources based on the first beta offset value and the second type of UCI is mapped to the identified resources in the frequency-interleaved manner over the bandwidth of the identified resources based on the second beta offset value.

31. The apparatus of claim 29, wherein the indication of the first beta offset value and the indication of the second beta offset value are signaled in a downlink control message.

32. The apparatus of claim 29, wherein the indication of the first beta offset value and the indication of the second beta offset value are signaled in relation to values established by a radio resource control (RRC) configuration of the user equipment.

33. The apparatus of claim 27, wherein the first type of UCI or the second type of UCI comprises ACK/NACK information, the apparatus further comprising:
   means for mapping a demodulation reference signal (DM-RS) to a first symbol of the identified resources, wherein the ACK/NACK information is mapped to one or more symbols adjacent to the DM-RS in the frequency-interleaved manner.

34. A non-transitory computer-readable medium storing computer executable code, the code when executed by a processor cause the processor to:
   identify resources for an uplink transmission on a physical uplink shared channel (PUSCH);
   map a first type of uplink control information (UCI) to the identified resources in a frequency-interleaved manner over a bandwidth of the identified resources;
   map a second type of UCI to the identified resources in the frequency-interleaved manner over the bandwidth of the identified resources, at least one of the first type of UCI or the second type of UCI being mapped to resources that overlap in time and are distributed over a plurality of non-adjacent sets of tones in frequency based on a dynamically configurable parameter;
   map data to the PUSCH over the bandwidth of the identified resources in a time-first or a frequency-first manner; and
   transmit the uplink transmission on the identified resources of the PUSCH in accordance with the mapping, the uplink transmission comprising the first type of UCI and the second type of UCI frequency-interleaved with the data.

* * * * *